April 26, 1966 W. A. GETTIG ETAL 3,247,850
CARTRIDGE-SYRINGE AND NEEDLE ASSEMBLY BONDED
TOGETHER WITH A CONTINUOUS LINE OF ADHESIVE
Filed Aug. 9, 1962 2 Sheets-Sheet 1
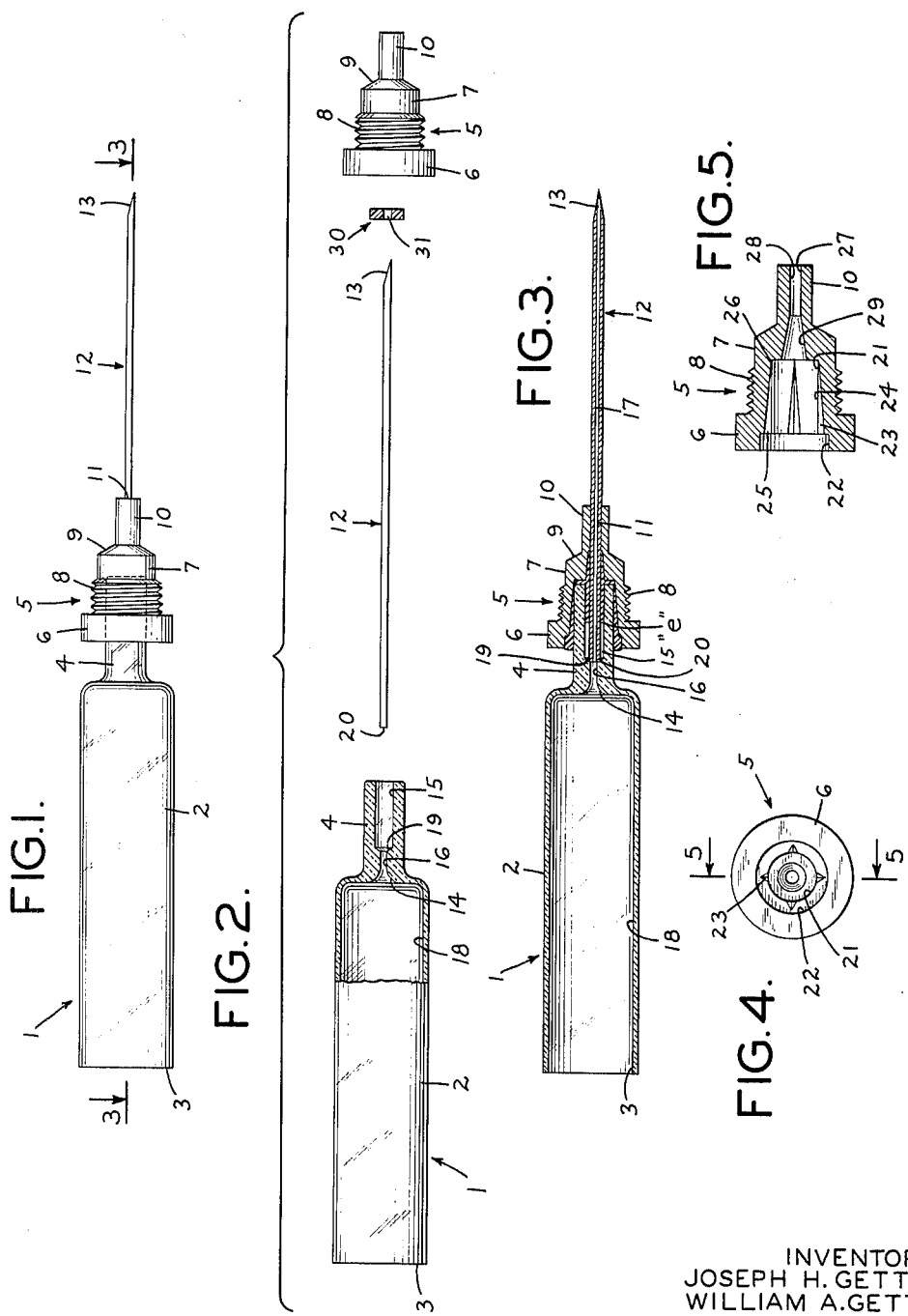
INVENTORS:
JOSEPH H. GETTIG
WILLIAM A. GETTIG
BY
Andrew Kafkor
ATTORNEY April 26, 1966 W. A. GETTIG ETAL 3,247,850
CARTRIDGE-SYRINGE AND NEEDLE ASSEMBLY BONDED
TOGETHER WITH A CONTINUOUS LINE OF ADHESIVE
Filed Aug. 9, 1962 2 Sheets-Sheet 2
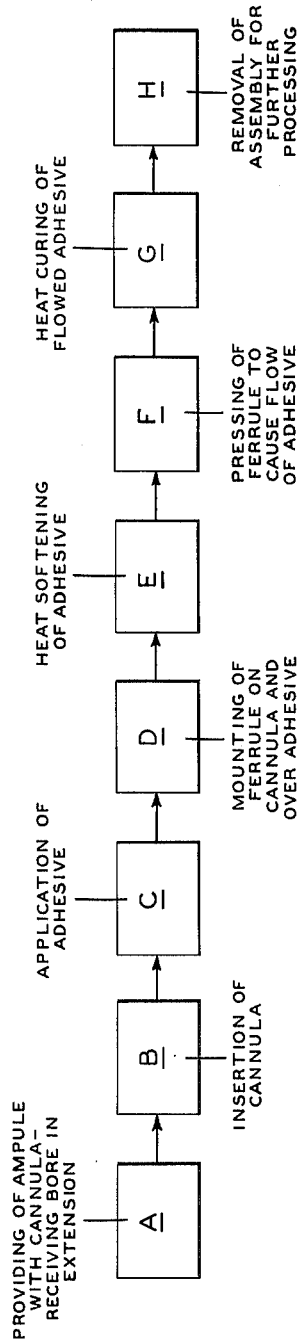
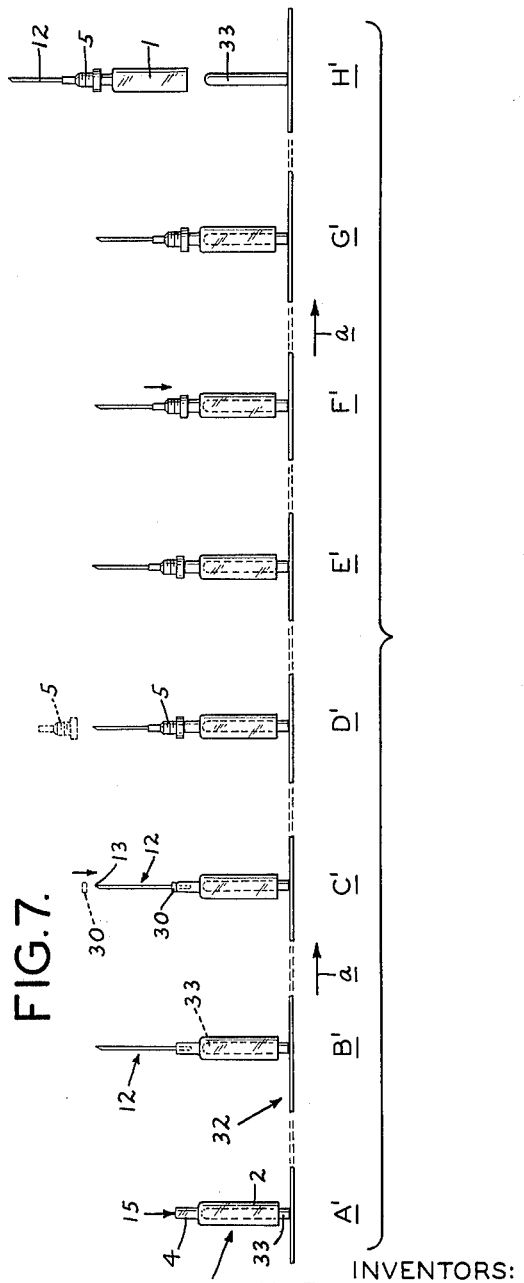
INVENTORS:
JOSEPH H. GETTIG
WILLIAM A. GETTIG
BY
Andrew Kafko
ATTORNEY

United States Patent Office

3,247,850
Patented Apr. 26, 1966

3,247,850
CARTRIDGE-SYRINGE AND NEEDLE ASSEMBLY BONDED TOGETHER WITH A CONTINUOUS LINE OF ADHESIVE
William A. Gettig, Millheim, and Joseph H. Gettig, Boalsburg, Pa., assignors to American Home Products Corporation, New York, N.Y., a corporation of Delaware
Filed Aug. 9, 1962, Ser. No. 215,819
14 Claims. (Cl. 128—221)

This invention relates generally to hypodermic cartridge-syringe units. More particularly, the invention pertains to a novel combination of a metal hypodermic needle attached to a glass ampule by a continuous film of adhesive to form a cartridge-syringe assembly.

Of the many kinds of hypodermic syringes obtainable commercially, those of the type referred to as "cartridge-syringe" units have become widely accepted and used by the medical profession. The cartridge-syringe unit generally comprises a transparent cartridge containing an injectable material, a hypodermic needle permanently affixed to one end of the cartridge, and, in the other end thereof, a reciprocal plunger, to which is attachable a push rod, whereby the injectable material may be forced out of the cartridge and through the needle. The use of glass for the transparent cartridge has been conventional in most applications due primarily to its optimum transparency, susceptibility to cleaning and sterilization, and its inertness to the medicaments contained in the cartridges. It has similarly been conventional that the hypodermic needle be stainless steel of a grade and composition which is impervious to known medicaments.

Up to the present time, these known cartridge-syringe units comprising a glass ampule and a metal hypodermic needle, have usually had these two elements affixed to each other by the crimping of a metal ferrule having the needle or cannula affixed thereto, to the end of the glass tube or ampule contoured or beaded for that purpose. While this general method is the one in widest use for assembling these cartridge-syringe units, there are known drawbacks inherent in this mode of assembly. For example, the method requires very close control of the dimensions of the glass tube with respect to the contoured or beaded end to which the metal ferrule is to be crimped. This in itself is very costly. The method also requires the machining of the metal ferrules to microtolerances. This adds further to the cost of manufacture. Moreover, at assembly, the metal ferrules must be sealed with rubber gaskets, diaphragms, washers, or the like to render the units fluid-tight. Another drawback of the method is that slight variations in the piece to piece units, when handled in extremely large quantities, creates great inspection problems. As a result, failure to detect and eliminate off size pieces results in a high percentage of breakage of the glass ampules, loss of ferrules, loss of cannulae, loss of medicaments, and loss due to work stoppage.

In certain attempts to eliminate the recognized disadvantages of the mode of assembling cartridge-syringe units as referred to above, the ampules have been made entirely of synthetic plastics with only the needle of metal affixed thereto without the use of a metal ferrule. However, the various cartridge-syringe units of such materials are seriously limited in their use, respectively to only a restricted number of medicaments which the particular plastic material will not contaminate. In other attempts to avoid the necessity of a metal ferrule to affix the hypodermic needle to the ampule, the units have been so constructed as to be cumbersome, unwieldy and even unsterile.

In consideration of the foregoing, it is a primary object of the present invention to provide a cartridge-syringe assembly of reduced cost comprising a glass ampule having a metal hypodermic needle attached thereto by means of a plastic ferrule.

It is another object of the invention to provide such a cartridge-syringe assembly wherein an adhesive is employed to retain the parts in operative relationship.

It is another object to provide said assembly wherein the ferrule is attached to the glass ampule, the needle is attached to the ferrule and the glass ampule is attached to the needle by a substantially continuous film of adhesive whereby the junctions between the respective parts are hermetically sealed, and to provide a unit having the required resistance to mechanical disconnection.

Another object is to provide such a cartridge unit assembly wherein the adhesive employed does not present problems of toxicity to the medicaments to be contained in the units.

It is another object to provide a glass ampule of a novel structure particularly adapted for assembly with the ferrule and hypodermic needle.

It is another object to provide a ferrule of an internal and external configuration which particularly adapts said element to the mode of assembly in accordance with the invention.

Another object of the invention is to provide cartridge-syringe unit elements which lend themselves to mass production methods of assembly.

Other objects and advantages of the invention will appear from an understanding of the invention upon reading the description thereof which follows.

Generally, the novel cartridge-syringe assembly of the invention comprises a glass ampule, a metal hypodermic needle, and a thermoset plastic ferrule, wherein the ferrule is mounted at one end of the ampule and the hypodermic needle is mounted on the ferrule and in communication with the interior of the ampule, and a thermoset plastic adhesive permanently retains the ampule, the metal hypodermic needle, and the thermoset plastic ferrule in the stated relationship.

In a preferred embodiment of the invention, the glass ampule is formed so as to have a reduced diameter extending outwardly at one end thereof and along the same central axis as the glass tube from which the ampule may conveniently be formed. The extension so formed preferably has an outside diameter and length which adapts it for facile insertion into the cavity which is provided in the plastic ferrule for this purpose, as described hereinafter. In this preferred embodiment, the narrower extension of the ampule has an axial bore therethrough which connects and forms a conjunctual opening with the interior or bore of the main glass ampule body. The bore in the narrower extension of the ampule has two regions of differing internal diameters. The distal portion of the bore has an interior diameter substantially equal to the outside diameter of the blunt end of the hypodermic needle to be inserted therein. The balance or proximal portion of the bore has an interior diameter substantially equal to the inside diameter of the bore or passageway in the needle. This internal configuration of the bore in the ampule extension provides a shoulder or seat at the juncture of the distal and proximal bore portions and it is against this shoulder that the blunt end of the needle rests with the passageway therein in communication with the proximal portion of the bore in the extension, when inserted blunt end first into the distal region of said bore.

A ferrule is provided which is preferably molded from a thermoset plastic material such as a commercially available glass-filled alkyd resin or a halogenated polymer such as Teflon or other suitable material. The selection of the particular material of which the ferrule is molded is governed by the required characteristics for the particular application with respect to required mechanical strength, chemical or physical inertness, thermal resistance, thermal stability (i.e., capability of withstanding high temperatures and extreme temperature variations without distortion or degradation), moldability, compatibility with the adhesive referred to hereinafter, and the like. The ferrule of generally conical shape is preferably molded so that its outside dimensions and specific contour may adapt it for the nature of the particular use for which the cartridge-syringe unit is intended. Thus, where the unit is to be provided with a screw-on cover (which may function alternatively as the push rod for the plunger in the cartridge as disclosed in U.S. Patent 2,671,449) a male screw thread may be provided on the ferrule surface. Generally, the inside diametral dimensions of the generally conically shaped ferrule conforms at its larger end to the diameter of the ampule extension on which it is supported, and at its other end, to the exterior diameter of the blunt end of the needle which is mounted therein. A preferred specific channel and varying internal diameter formation within the ferrule which has been found to provide excellent adherence characteristics upon application of an adhesive will appear from a detailed description of a preferred embodiment of the invention described hereinafter.

In accordance with the preferred form of the invention, a thermoset epoxy resin is used to cement the ampule, ferrule, and needle together into an integral assembly. The epoxy resin as applied may be in any form such as a liquid, powder or a molded solid or semi-solid. However, we prefer to utilize a molded solid or semi-solid epoxy resin for reasons which will be referred to hereinafter in connection with the description of a specific embodiment of the method of the invention. It may be stated here that it is desirable for our particular purpose to have the epoxy resin provided with a latent hardening system and, in its uncured state, formed into annular rings of an outside diametral dimension substantially equal to the outside diametral dimension of the ampule extension, and of an inside diametral dimension somewhat greater than the outside diametral dimension of the hypodermic needle. Preferably, the epoxy resin has a softening temperature significantly below its curing temperature for reasons that will appear hereinafter, and is rendered non-toxic at the latter temperature and insoluble in any substance or solution other than the known aromatic solvent strippers compounded for this particular purpose.

The general method of assembly in accordance with the present invention can be accomplished by operational steps that may be varied as to sequence. However, we prefer that the ampules are delivered to a conveyorized system of upright pins over each of which the original bore of one of said ampules is threaded whereby the ampule is positioned with the formed narrower and bored extension thereof directed substantially vertically upwards. Thereafter, a hypodermic needle of the correct diametral dimensions is threaded by its blunt end downwardly into that portion of the ampule extension bore which has the larger diameter adapted for accepting said needle end. The previously referred to formed ring of uncured epoxy resin containing the latent hardening system is then threaded downwardly over the sharp end of the needle and allowed to come to rest on the extreme upper end of the ampule extension. The plastic ferrule is next threaded over the sharp end of the needle with the larger end of the ferrule which has the bore or cavity thereof for accommodating the narrowed extension of the ampule first. The ferrule is projected downwardly on the cannula until said cavity arrives in conjugate coupling with the ampule extension. This action captures the annular molded epoxy pill between the ampule extension and the plastic ferrule. In this relationship of the parts, the annular pill surrounds the cannula at a location substantially above the junction between the blunt end of the cannula and the shoulder in the extension bore which had been formed to receive and seat said end.

Upon completion of the assembly of the above-described components, the carrier system conveys the assembly through a first controlled heating chamber wherein the temperature is controlled to regulate the plasticity of the epoxy pill so that it forms a soft gel. After leaving the chamber in which the epoxy resin is brought to the gel form, the assembly is moved through a station wherein the ferrule is subject to slight downward pressure. The pressing system can be of conventional design and comprise commercially obtainable hydraulic, air or mechanical equipment. However, the equipment is preferably of the type that may be delicately controlled for minimum effort, and soft and gentle action, in consideration of the minimal resistance to flow afforded by the gelled resin, the short travel of the ferrule necessary to complete the pressing operation, and the relative fragility of the parts.

In accordance with one aspect of the invention, because of the use of the particular relationships between the opposed surfaces of the exterior of the cannula, the interior of the ferrule and between both the interior and exterior of the ampule extension, as described in greater detail hereinafter, this pressure operation causes the now gelled epoxy resin to flow in various desired directions. Thus, the epoxy resin flows upwardly along the cannula wall where the cannula is encompassed by the ferrule bore, downwardly between the cannula and the larger diameter bore in the ampule extension, and outwardly and downwardly between the outside diameter of the extension and the inside diameter of the ferrule where the extension is within the ferrule cavity. In this manner the epoxy resin is caused to flow and to be positioned to provide, upon curing, a film of greatest possible overall area which covers three different contact areas and functions cooperatively to provide maximum sealing and retention characteristics to the finished assembly.

The carrier may then convey the assembled units, each on a respective mounting pin, through a second oven under controlled temperature conditions and for a sufficient time for performing the final curing operation, whereby the flowed adhesive is thermoset. Thereafter, the completed cartridge-syringe assemblies are removed from their respective pins on the endless conveyor system to provide pins to be loaded at the other end of said system.

The cartridge-syringe units are then ready for further processing, such as sterilization thereof, application of a removable sheath over the needle, filling of the ampule with medicament or reconstituting liquid, insertion of the plunger in the ampule over the medicament or other liquid, addition of a combined cannula cover and plunger-push rod, packaging of the final assemblies, etc.

Preferred embodiments of our invention, with respect to the novel cartridge-syringe unit assembly structure and the method of assembling the same, are now described below and illustrated in the accompanying drawings. As will be understood, the description and drawings are intended to be illustrative only and not to limit the scope of the invention as defined in the appended claims.

Reference is now made to the drawings wherein

FIG. 1 is a side elevational view of a cartridge-syringe unit assembly in accordance with the present invention;

FIG. 2 is an exploded representation of the elements of the assembly shown in FIG. 1, with the end of the ampule bearing the narrower extension thereof shown broken away;

FIG. 3 is a complete cross-section of the assembly of FIG. 1 taken on line 3—3 of the latter;

FIG. 4 is an enlarged end view of the ferrule of FIGS. 1–3, apart from the assembly as shown in FIG. 2 and as viewed towards the right therein;

FIG. 5 is a cross-sectional view of the ferrule shown in FIGS. 2 and 4 and taken on section line 5—5 of the latter;

FIG. 6 is a flow diagram of a preferred sequence of operational steps for assembling the unit illustrated in FIGS. 1–5; and FIG. 7 is a schematic representation of the manner in which the assembly is formed by the operational steps depicted in FIG. 6, while moving on a conveyor belt with the appearance of the assembly at each of said operational steps being shown keyed to a respective one of said steps.

Referring to FIG. 1, the finally assembled cartridge-syringe unit assembly comprises a glass ampule 1 having a main cylindrical body 2 with a fully open end 3. The end opposite open end 3 is provided with a narrowed extension 4 on which is mounted plastic ferrule 5 of generally conical outline. Ferrule 5 is provided with a radially extending flange 6 at its wider end, an intermediate section 7 having a male screw-thread 8 formed thereon, a cover engaging shoulder 9, and a reduced cannula supporting section 10. Positioned within reduced portion 10, is the proximal blunt end region 11 of the hypodermic needle or cannula 12 provided with the usual sharp distal end 13. As seen in FIGS. 2 and 3, the formed extension 4 on ampule 1 has an axial bore 14 therethrough which has a larger diameter portion 15 adapted to accept the base end region 11 of cannula 12. The remaining portion 16 of bore 14 has a diameter substantially equal to that of the bore 17 in cannula 12 and, as shown, is in communication with the main bore or interior 18 of ampule 1. As seen in FIGS. 2 and 3, at the conjunction of the two bore portions 15 and 16 of differing diameters, there is formed a shoulder 19 on which the blunt end 20 of base region 11 of cannula 12 bears when the latter is positioned fully within bore portion 15, as seen in FIG. 3.

As best seen in FIGS. 4 and 5, ferrule 5 has a main cavity or bore 21 of a diameter substantially equivalent to the outside diameter of extension 4 on ampule 1. At the larger end of generally conical ferrule 5, accommodated within radical flange 6, in communication at one end with the exterior and at the other end with bore 21 is a plastic adhesive overflow recess 22. Recess 22 is aligned axially with said bore 21 and of a diameter slightly larger than that of the latter. A set of four tapering channels 23 are provided around the periphery of bore 21 and extending generally axially thereof. Each of channels 23 is in lateral communication with bore 21 for its entire length at 24. Channels 23 taper from their larger ends 25 which open into overflow recess 22 as does bore 21 and diminish at their ends 26 at the other end of the bore 21. Axially aligned with main bore 21 is a smaller dimensioned bore 27 extending through the reduced nose or cannula supporting section 10 of ferrule 9 which, at its distal portion 28, has a diameter substantially equivalent to that of the outside diameter of the blunt end region 11 of cannula 12. The proximal portion 29 of bore 27 tapers from its junction with bore 28 in the median region of bore 27, to widen as it extends inwardly to connect with main bore 21.

A ring 30 of epoxy adhesive in semi-solid form is provided with the aperture 31 therethrough of a diameter substantially equal to the maximum outside diameter of cannula 12. The external diameter of ring 30 is slightly less than the outside diameter of extension 4 of ampule 1 and hence easily accommodated within overflow recess 22 of ferrule 5. The axial thickness of ring 30 and the width of the annulus of material delimited interiorly by the diameter of aperture 31 and exteriorly by the external diameter of ring 30 itself, obviously determine the total mass of adhesive furnished by said ring. As seen in FIG. 3, the ring dimensions (FIG. 2) furnish, in the finished assembly, a mass sufficient to form at least a continuous film of adhesive between the ferrule interior and the cannula blunt end region exterior, and between the ampule extension interior (bore 15) and the cannula blunt end region exterior, as described in more detail hereinafter. Although the film between the ampule extension interior and the cannula blunt end region exterior is shown terminating at "e," the point of termination may obviously vary along bore 15 (but preferably not beyond the blunt end 20 of cannula 12 to minimize contact of the liquid in the ampule therewith) depending upon the quantity of material furnished by ring 30.

In FIG. 6, there is disclosed a flow diagram of a preferred sequence of general operation steps A–H for producing cartridge-syringe unit assemblies in accordance with the present invention, manually or automatically. To assemble the units in a continuous fashion, there is preferably provided, as indicated schematically in FIG. 7, a continuous conveyor system 32 provided with upright pins 33 (shown partly in phantom) on an endless belt 34 driven by means (not shown) in the direction of arrows a. Pins 33 each have an external diameter dimensioned to receive thereover the interior diameter 18 of the main body 2 of one of the ampules 1. The operational steps A–H of FIG. 6 have respectively keyed thereto the visual representations A'–H' in FIG. 7 of the manner in which the assembly may be produced on a continuous conveyor belt.

In the continuous procedure illustrated in FIG. 7, the provision of an ampule is achieved as at A' by dropping ampule 1 with its fully open bottom 3 directed downwardly onto a pin 33 whereby bore 15 in extension 4 is directed upwardly. Conveyor system 32 transports pin 33 with upright ampule 1 thereon to location B' where a cannula 12 is inserted with its blunt end 20 first downwardly into bore 15 in extension 4 until end 20 sits on shoulder 19. Adhesive is then applied at C', and this is preferably achieved by positioning a ring 30 (shown in phantom) of an epoxy resin over the sharp end 13 of cannula 12 and threading the ring downwardly until, as shown in full lines, it abuts the upper edge of ampule extension 4 in which cannula 12 is maintained in upright position. Thereafter, at D', ferrule 5 is positioned above cannula 12 with the larger end thereof bearing flange 6 and overflow recess 22 first (as indicated in phantom) and then threaded downwardly over cannula 12 until ferrule 5 abuts and is supported on ring 30 of epoxy resin as shown in full lines. At the location of operational step E', the ring of epoxy resin adhesive is softened. With the parts in substantially the same relationship as at D', the conveyor system then carries the assembly to location E' into a heating chamber (not shown) which is maintained at a temperature which softens the resins to the gel form without curing the resin. As will be understood by those skilled in the art, the thickness of the epoxy ring 30, applied as at C', and the softening temperature and the time during which such temperature is applied as at E', may be chosen and controlled to regulate the plasticity and flow characteristics of the epoxy resin for optimum speed and economy of operation, as well as for a most important purpose again referred to below.

At the next location F', a controlled pressure is applied downwardly by pressing means (not shown) on ferrule 5 against the soft and liquifying epoxy resin maintained up to this time atop extension 4 and encircling cannula 12 beneath ferrule 5. The pressing action causes the resin to flow around and against the walls of cannula 12, the walls formed by the special inside contour of ferrule 5 and the walls formed by the exterior and interior surfaces of ampule extension 4 and bore 15 therethrough. Specifically, the resin flows downwardly between the walls of the end of region 11 of cannula 12 and the ampule extension bore 15, outwardly and downwardly between the outside wall of extension 4 and the inside wall of bore 21 in ferrule 5 where said ampule extension 4 meets in conjugate coupling with ferrule cavity 21, and relatively upwardly, as ferrule 5 is pressed downwardly, mostly via tapered channels 23 to tapered bore 29 also surrounding a portion of the blunted end of cannula 12. Thus, as will be observed, the jelly-like epoxy resin is automatically placed, ready for the curing temperature yet to be applied, in position as at least a film over a greatest possible area to provide upon curing three different contact regions acting cooperatively to provide maximum retention of the parts and minimum surface exposure to the liquid to be contained in ampule 1, as appears in FIG. 3. Excellent results have been obtained where the ultimate clearances between the opposed surfaces of the various parts are such that for the most part, the flowed epoxy forms a film therebetween of from 4 to 8 mils thick.

With the several parts and flowed epoxy resin positioned as described for location F', the assembly is then passed to a heat curing chamber (not shown) at location G' where the assembly resides for a time sufficient to permit curing of the resin and removal of volatiles therefrom.

Finally, the assembly approaches a removal H' at which the article, now ready for subsequent processing in the manufacture of the ultimate cartridge-syringe unit, is removed from its carrying pin 33. The bared carrying pins 33 then move on the endless conveyor 32 through a repeat cycle via locations A'–H' for a continuous operation.

While a preferred embodiment of the assembly and a preferred method of preparing the same has been described in detail, as will be understood by those skilled in the art, various changes and modifications may be made therein without departing from the spirit and scope of the invention as defined in the appended claims. Merely by way of example, the choice of plastic material for the ferrule and for the adhesive may be varied under certain circumstances depending upon the intended use of the resulting assembly. The size of the plastic ring may be varied depending upon the gel, flow, cure and other characteristics of the adhesive employed, the heating cycles utilized for gel and cure of said adhesive, the dimensions of the parts to be assembled and clearances therebetween, etc. The clearances between the opposed surfaces may be varied from the optimum wherein a film mostly 4–8 mils thick is formed as set forth hereinbefore. The method may be performed in some instances completely manually, partially manually and automatically, or completely automatically, etc.

We claim:

1. A cartridge-syrings assembly comprising an ampule, a ferrule, and a hypodermic needle, said ferrule being mounted at one end of said ampule, said hypodermic needle extending through said ferrule and in communication with the interior of said ampule, and a continuous layer of cured adhesive adhering to said ampule, said hypodermic needle and said ferrule, bonding said hypodermic needle to said ampule, and permanently retaining said ampule, said hypodermic needle, and said ferrule in said relationship.

2. A cartridge-syringe assembly comprising a glass ampule, a thermoset plastic ferrule, and a metal hypodermic needle, said ferrule being mounted at one end of said ampule, said hypodermic needle extending through said ferrule and being mounted in said ampule in contact therewith and in communication with the interior of said ampule, and a thermoset plastic adhesive adhering to said ampule, said hypodermic needle and said ferrule, bonding said hypodermic needle to said ampule, and permanently retaining said glass ampule, said metal hypodermic needle, and said thermoset plastic ferrule in said relationship.

3. A cartridge-syringe assembly comprising a glass ampule, a thermoset plastic ferrule, and a metal hypodermic needle, said ferrule being mounted at one end of said ampule and having a bore therethrough, said hypodermic needle extending through said ferrule and through said end of said ampule and in communication with the interior of said ampule, and a thermoset plastic adhesive between a portion of the outer surface of said end of said ampule and a portion of the inner surface of the bore in said ferrule, between another portion of the inner surface of the bore in said ferrule and a portion of the outer surface of said hypodermic needle, and between an inner surface portion of the end of said ampule and another portion of the outer surface of said hypodermic needle, said thermoset plastic adhesive permanently retaining said ampule, said metal hypodermic needle, and said thermoset plastic ferrule in said relationship.

4. A cartridge-syringe assembly comprising:
(1) a glass ampule having a narrow extension at one end thereof and an axial bore extending completely through said extension and in communication with the interior of said glass ampule;
(2) a thermoset plastic ferrule having a bore therethrough which has a portion thereof of a diameter greater than that of said narrow extension and adapted to accommodate at least a part of the latter, and another portion thereof merging with said greater diameter bore portion and being of a lesser diameter adapted to receive the blunt end of a metal hypodermic needle;
(3) a metal hypodermic needle;
said ferrule being mounted by means of said greater diameter bore portion on said narrow extension of said ampule, and said hypodermic needle extending through said lesser diameter bore portion in said ferrule and within said axial bore in said narrow extension; and
(4) a continuous film of thermoset plastic adhesive between the adjacent opposed surfaces of said ampule, said metal hypodermic needle, and said thermoset plastic ferrule and permanently retaining said parts in said relationship.

5. A cartridge-syringe assembly comprising:
(1) a glass ampule having a narrow extension at one end thereof and disposed axially thereto, said extension having an axial bore completely therethrough, said bore having in its distal region a first internal diameter substantially equivalent to the external diameter of the blunt end of a hypodermic needle to be inserted therein, and in its proximal region a second internal diameter less than said first internal diameter and substantially equal to the axial bore in the hypodermic needle to be inserted in the ampule, and a shoulder having a surface facing said distal region formed at the junction of said internal diameters;
(2) a thermostat plastic ferrule having a bore therethrough which has a first portion thereof of a diameter greater than the external diameter of said narrower extension and adapted to accommodate the distal end of the latter, and a second bore portion merging with said first bore portion and being of a lesser diameter adapted to receive therethrough the blunt end of a hypodermic needle;
(3) a metal hypodermic needle having a sharp end and a blunt end;
said ferrule being mounted by means of said first bore portion on the distal end of said narrow extension of said ampule, and said blunt end portion of said hypodermic needle extending through said section bore portion in said ferrule and within said first portion of said axial bore in said narrow extension with said blunt end of said needle in abutment with said surface of said shoulder; and
(4) a continuous film of thermoset plastic adhesive extending between the adjacently opposed surfaces respectively of (a) the internal surface of said distal bore region of said ampule extension and the external surface of said blunt end portion of said hypodermic needle, (b) the interior surface of said first bore portion of said ferrule and the exterior surface of said distal end of said ampule extension, and (c) said second bore portion of said ferrule and the external surface of said blunt end portion of said hypodermic needle, for permanently retaining said parts in said relationship.

6. A cartridge-syringe assembly as claimed in claim 5 wherein the thermoset plastic ferrule is of a glass-filled alkyd and the thermoset plastic adhesive is an epoxy resin.

7. A ferrule adapted for a cartridge-syringe assembly, said ferrule having a generally tapered configuration in the axial direction, an axially disposed shallow bore in the wider end of said ferrule, an axially disposed longer bore in communication with said first bore and having a diameter substantially equal to the exterior diameter of the ampule on which it is to be mounted, a plurality of channels disposed circumferentially of said longer bore and extending generally parallel to the main axis of said ferrule, said channels communicating at one of their ends with said shallow bore and at one of their sides with said longer bore, an axially disposed tapering bore having the wide end thereof in communication with said longer bore, said tapering bore having the narrower end thereof merging into a narrow bore which extends towards and is in communication with the exterior of the narrow end of said ferrule, the internal diameter of said narrow bore being substantially equal to the external diameter of the blunt end portion of a cannula to be inserted therein.

8. A ferrule as claimed in claim 7 wherein said channels taper in the same general direction as does said ferrule.

9. A ferrule as claimed in claim 9 comprising a hardened plastic material.

10. A ferrule as claimed in claim 9 wherein the hardened plastic material is a thermoset glass-filled alkyd.

11. A cartridge-syringe sub-assembly comprising an ampule, a hypodermic needle mounted in said ampule and protruding therefrom, an adhesive preform adapted for joining said ampule, said hypodermic needle and a ferrule element of a cartridge-syringe assembly later to be supplied, said preform being in the general shape of a ring having an axial aperture therethrough of a diameter substantially equal to the maximum outside diameter of said needle on which it is threaded and in abutment with a portion of said ampule where said needle protrudes therefrom, said preform being of a material that is softenable without substantial curing.

12. A cartridge-syringe sub-assembly as claimed in claim 11 wherein said preform has an external diameter less than that of said portion of said ampule with which it is in abutment.

13. A cartridge-syringe sub-assembly as claimed in claim 11 wherein said material is a solid thermosettable resinous substance that forms a gel upon heating prior to thermosetting.

14. A cartridge-syringe sub-assembly as claimed in claim 13 wherein the solid thermosettable resinous substance is an epoxy resin containing a latent heat-hardening catalyst.

References Cited by the Examiner

UNITED STATES PATENTS

| 2,269,593 | 1/1942 | Maltby | 156—294 |
|---|---|---|---|
| 2,464,840 | 3/1949 | Fogg | 128—218 |
| 2,711,171 | 6/1955 | Dunnican | 128—218 |
| 2,817,620 | 12/1957 | Golick et al. | 56—294 |
| 2,842,125 | 7/1958 | Stephany | 128—218 |
| 2,936,261 | 5/1960 | Cole | 156—308 |
| 2,943,011 | 6/1960 | Rayner | 156—308 |
| 3,066,063 | 11/1962 | Ecklund | 156—306 |

FOREIGN PATENTS

| 612,996 | 11/1926 | France. |
|---|---|---|
| 1,224,269 | 2/1960 | France. |
| 876,313 | 5/1953 | Germany. |
| 20,631 | 3/1911 | Great Britain. |
| 573,167 | 11/1945 | Great Britain. |
| 686,119 | 1/1953 | Great Britain. |
| 698,145 | 10/1953 | Great Britain. |
| 810,860 | 3/1959 | Great Britain. |
| 837,661 | 6/1960 | Great Britain. |
| 870,835 | 6/1961 | Great Britain. |

RICHARD A. GAUDET, *Primary Examiner.*

JORDAN FRANKLIN, *Examiner.*

R. D. TEGTMEYER, D. S. BURKS, D. L. TRULUCK,
*Assistant Examiners.*